US012561173B2

(12) United States Patent
Hong

(10) Patent No.: US 12,561,173 B2
(45) Date of Patent: Feb. 24, 2026

(54) METHOD FOR DATA PROCESSING AND APPARATUS, AND ELECTRONIC DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 496 days.

(21) Appl. No.: 17/641,347

(22) PCT Filed: Sep. 9, 2019

(86) PCT No.: PCT/CN2019/104878
§ 371 (c)(1),
(2) Date: Mar. 8, 2022

(87) PCT Pub. No.: WO2021/046674
PCT Pub. Date: Mar. 18, 2021

(65) Prior Publication Data
US 2022/0342706 A1 Oct. 27, 2022

(51) Int. Cl.
*G06F 9/50* (2006.01)
*H04W 76/10* (2018.01)

(52) U.S. Cl.
CPC ............. *G06F 9/505* (2013.01); *H04W 76/10* (2018.02)

(58) Field of Classification Search
CPC ............... G06F 9/505; G06F 2209/501; G06F 2209/503; G06F 2209/509; G06F 2209/549; G06F 9/5072; G06F 9/5088; G06F 9/5094; G06F 9/5027; G06F 9/547; H04W 76/10

USPC ......................................................... 318/105
See application file for complete search history.

(56) References Cited

U.S. PATENT DOCUMENTS

| | | | | |
|---|---|---|---|---|
| 2001/0046870 | A1* | 11/2001 | Stilp | G01S 5/06 455/457 |
| 2003/0016630 | A1* | 1/2003 | Vega-Garcia | H04L 9/40 370/468 |
| 2003/0040962 | A1* | 2/2003 | Lewis | G06Q 30/0255 705/14.4 |
| 2003/0195019 | A1* | 10/2003 | Litwin | H04M 1/72505 455/574 |
| 2004/0228279 | A1* | 11/2004 | Midtun | H04L 69/329 370/236 |

(Continued)

FOREIGN PATENT DOCUMENTS

| | | |
|---|---|---|
| CN | 105991711 A | 10/2016 |
| CN | 108990112 A | 12/2018 |
| WO | WO 2018126991 A1 | 7/2018 |

OTHER PUBLICATIONS

European Patent Application No. 19945031.3, Search and Opinion dated Mar. 31, 2023, 9 pages.

(Continued)

*Primary Examiner* — Tuan C Dao
(74) *Attorney, Agent, or Firm* — Cozen O'Connor

(57) ABSTRACT

A method for data processing includes: receiving capability information for processing data sent by a network-side device; determining whether the capability information satisfies a preset requirement of data to be processed; and in response to the capability information satisfying the preset requirement, sending the data to be processed to the network-side device for processing.

10 Claims, 13 Drawing Sheets

(56)  References Cited

U.S. PATENT DOCUMENTS

| | | | | |
|---|---|---|---|---|
| 2006/0022801 | A1* | 2/2006 | Husak | G06K 7/0008 |
| | | | | 340/10.5 |
| 2006/0030891 | A1* | 2/2006 | Saltzstein | H04W 84/022 |
| | | | | 607/32 |
| 2007/0250890 | A1* | 10/2007 | Joshi | H04N 21/26275 |
| | | | | 348/E7.071 |
| 2008/0141350 | A1* | 6/2008 | Merkin | G06F 21/31 |
| | | | | 726/5 |
| 2009/0312046 | A1* | 12/2009 | Clevenger | H02J 50/20 |
| | | | | 455/522 |
| 2011/0035487 | A1* | 2/2011 | Ouyang | H04L 67/1001 |
| | | | | 709/224 |
| 2011/0225311 | A1* | 9/2011 | Liu | H04L 45/125 |
| | | | | 709/231 |
| 2013/0287122 | A1* | 10/2013 | Mizosoe | H04N 21/2365 |
| | | | | 375/240.26 |
| 2016/0366135 | A1* | 12/2016 | Furuichi | H04L 63/107 |
| 2016/0373917 | A1* | 12/2016 | Logue | H04L 12/2809 |
| 2017/0118281 | A1* | 4/2017 | Lehmann | H04L 67/5682 |
| 2018/0183855 | A1 | 6/2018 | Sabella et al. | |
| 2018/0198883 | A1* | 7/2018 | Vuornos | H04L 67/5651 |
| 2018/0199227 | A1* | 7/2018 | Huang | H04W 88/06 |
| 2018/0205779 | A1* | 7/2018 | Pan | H04L 65/762 |
| 2020/0259896 | A1* | 8/2020 | Sachs | H04L 63/0428 |

OTHER PUBLICATIONS

PCT/CN2019/104878 International Search Report, dated May 28, 2021, 2 pages.
Chinese Patent Application No. 201980001929.7, Office Action dated Oct. 8, 2023, 5 pages.
Chinese Patent Application No. 201980001929.7, English translation of Office Action dated Oct. 8, 2023, 10 pages.
ETSI TS 138 331 (3GPP TS 38.331 version 15.3.0 Release 15), 5G; NR; Radio Resource Control (RRC); Protocol specification, Oct. 2018, 441 pages.
European Patent Application No. 19945031.3, Office Action dated Sep. 8, 2025, 11 pages.

* cited by examiner

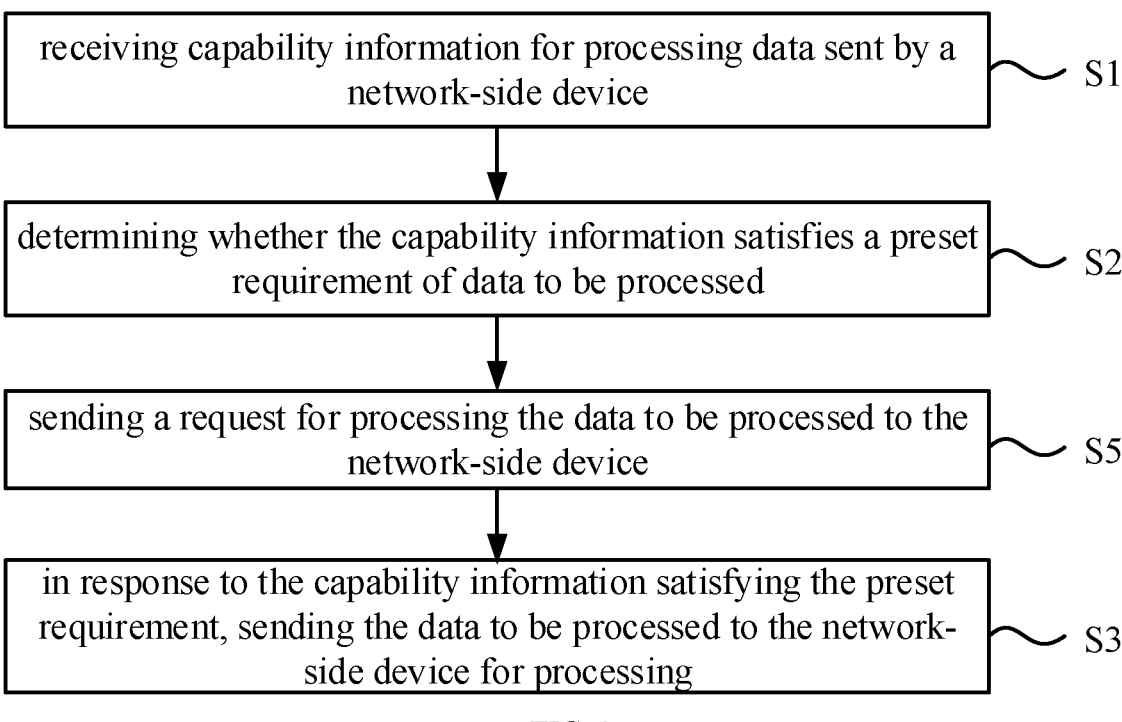

receiving capability information for processing data sent by a network-side device    S1 determining whether the capability information satisfies a preset requirement of data to be processed    S2 sending a request for processing the data to be processed to the network-side device    S5 in response to the capability information satisfying the preset requirement, sending the data to be processed to the network-side device for processing    S3

FIG. 3 receiving capability information for processing data sent by a network-side device    S1 determining whether the capability information satisfies a preset requirement of data to be processed    S2 in response to the capability information satisfying the preset requirement, sending the data to be processed to the network-side device for processing    S3 receiving data obtained after the network-side device processes the data to be processed    S6

FIG. 4

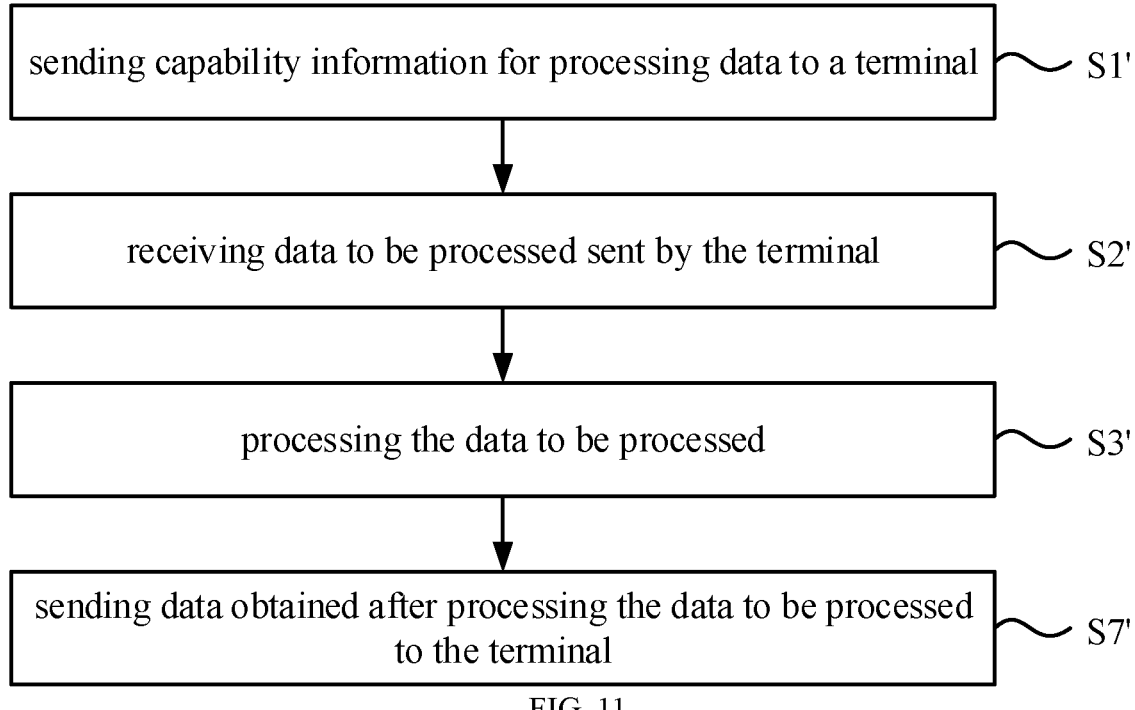

sending capability information for processing data to a terminal ~ S1' receiving data to be processed sent by the terminal ~ S2' processing the data to be processed ~ S3' sending data obtained after processing the data to be processed to the terminal ~ S7'

FIG. 11

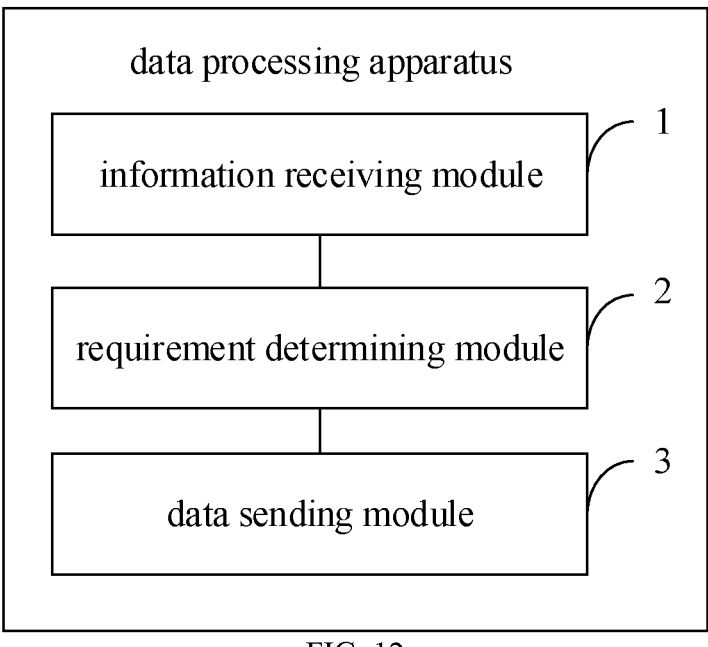

data processing apparatus information receiving module ⌐ 1 requirement determining module ⌐ 2 data sending module ⌐ 3

FIG. 12 data processing apparatus information receiving module — 1 requirement determining module — 2 data sending module — 3 first requirement sending module — 4 data processing apparatus information receiving module — 1 requirement determining module — 2 data sending module — 3 second requirement sending module — 5 data processing apparatus information receiving module   1 requirement determining module   2 data sending module   3 second determining module   8 data processing apparatus information receiving module   1 requirement determining module   2 data sending module   3 data processing module   9 data processing apparatus information sending module — 1' first request receiving module — 4' data receiving module — 2' data processing module — 3'

METHOD FOR DATA PROCESSING AND APPARATUS, AND ELECTRONIC DEVICE

CROSS-REFERENCE TO RELATED APPLICATION

The present application is a U.S. national stage of International Application No. PCT/CN2019/104878, filed on Sep. 9, 2019, the contents of all of which are incorporated herein by reference in their entireties for all purposes.

TECHNICAL FIELD

The present disclosure relates to a field of communication technology, and in particular, to a method for data processing, a data processing apparatus, an electronic device and a computer-readable storage medium.

BACKGROUND

Currently, in a scenario where a terminal communicates with a network-side device such as a base station, the main function of the network-side device is to configure time-frequency resources for the terminal to use for communication, and typically, the network-side device does not play any other role.

Processing-intensive functions, such as that involving image processing, artificial intelligence or machine learning, for example, requires more and more resources from a terminal which can slow the operation of the terminal to unacceptable levels.

SUMMARY

According to a first aspect of the present disclosure, a method for data processing is provided. The method is performed by a terminal. The method includes:

receiving capability information for processing data sent by a network-side device;

determining whether the capability information satisfies a preset requirement of data to be processed; and in response to the capability information satisfying the preset requirement, sending the data to be processed to the network-side device for processing.

According to a second aspect of the present disclosure, a method for data processing is provided. The method is performed by a network-side device. The method includes:

sending capability information for processing data to a terminal;

receiving data to be processed sent by the terminal; and processing the data to be processed.

According to a third aspect of the present disclosure, an electronic device is provided. The electronic device includes:

a processor; and a memory for storing instructions executable by the processor.

The processor is configured to implement the method for data processing performed by the terminal according to any of the above embodiments.

According to a fourth aspect of the present disclosure, an electronic device is provided. The electronic device includes:

a processor; and a memory for storing instructions executable by the processor.

The processor is configured to implement the method for data processing performed by the network-side device according to any of the above embodiments.

According to a fifth aspect of the present disclosure, a non-transitory computer-readable storage medium is provided. A computer program is stored in the computer-readable storage medium. When the computer program is executed by a processor, the method for data processing performed by the terminal according to any of the above embodiments is performed.

According to a sixth aspect of the present disclosure, a non-transitory computer-readable storage medium is provided. A computer program is stored in the computer-readable storage medium. When the computer program is executed by a processor, the method for data processing performed by the network-side according to any of the above embodiments is performed.

BRIEF DESCRIPTION OF THE DRAWINGS

In order to explain the technical solutions in embodiments of the disclosure more clearly, the accompanying drawings to be used in the description of the embodiments will be briefly introduced below. Obviously, the accompanying drawings described below are only some embodiments of the present disclosure. Those skilled in the art may obtain other drawings from these drawings without creative work.

FIG. 3 is a flow chart of a method for data processing according to yet another embodiment of the present disclosure.

FIG. 4 is a flow chart of a method for data processing according to yet another embodiment of the present disclosure.

FIG. 11 is a flow chart of a method for data processing according to yet another embodiment of the present disclosure.

FIG. 12 is a block diagram showing a data processing apparatus according to an embodiment of the present disclosure.

DETAILED DESCRIPTION

The technical solutions in the embodiments of the disclosure will be clearly and completely described below with reference to the accompanying drawings. Obviously, the described embodiments are only a part of the embodiments of the disclosure, rather than all the embodiments. Based on the embodiments in the disclosure, all other embodiments obtained by those skilled in the art without creative efforts shall fall within the protection scope of the disclosure.

With the development of communication technology, the amount of data required to be processed by the terminal is getting larger and larger, and the performance of the network-side device is also greatly improved. If the network-side device is only used to configure time-frequency resources for the terminal, the performance of the network-side device cannot be fully used. In addition, because the terminal has a limited ability to process data, a problem of high time delay for the terminal to process data may occur.

Figure 1:
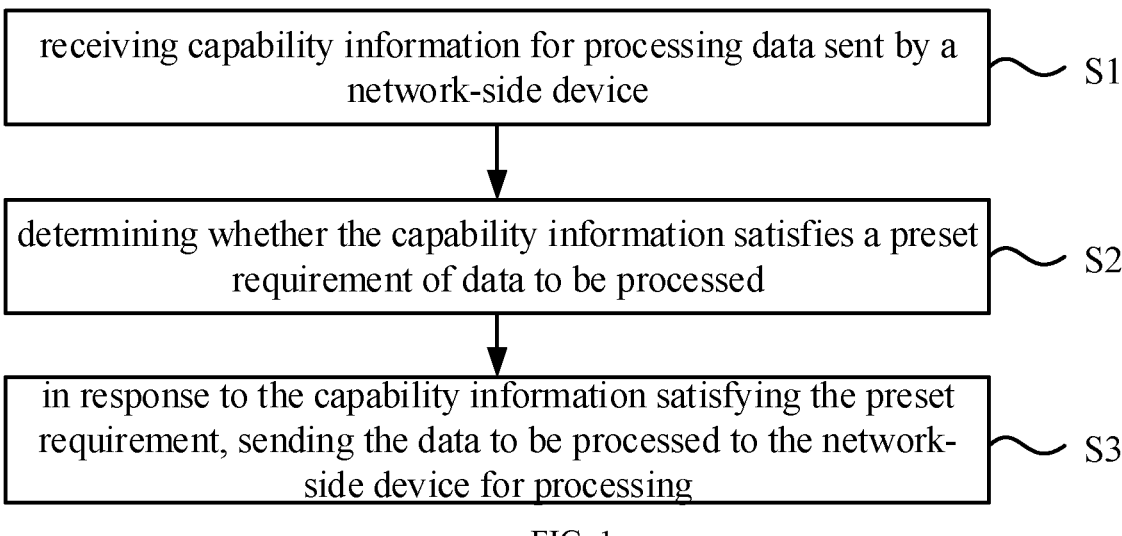
FIG. 1 is a flow chart of a method for data processing according to an embodiment of the present disclosure.

FIG. 1 is a flow chart of a method for data processing according to an embodiment of the present disclosure. The method for data processing illustrated in this embodiment may be suited for a terminal. The terminal includes, but is not limited to, an electronic device such as a mobile phone, a tablet computer, and a wearable device. The terminal may be used as user equipment to communicate with a network-side device (such as a base station, a core network, and a multi-access edge computing server). For example, the terminal may communicate with the network-side device based on 4G LTE (long term evolution), and may also communicate with the network-side device based on 5G NR (new radio).

The terminal and the network-side device may have AI (artificial intelligence) capabilities. Based on the AI capabilities, the terminal can quickly process information such as images, videos, languages, and texts, so as to quickly respond to the user. Compared with the terminal, the network-side device can process a larger amount of data, and the processing speed can be faster than that of the terminal. For example, the network-side device can use a large amount of data as a sample for machine learning to obtain a machine learning model for processing data.

As illustrated in FIG. 1, the method for data processing may include the following steps.

In step S1, capability information for processing data sent by a network-side device is received.

In step S2, whether the capability information satisfies a preset requirement of data to be processed is determined.

In step S3, in response to the capability information satisfying the preset requirement, the data to be processed is sent to the network-side device for processing.

In an embodiment, the network-side device may send the capability information for processing data to the terminal, such as a data processing speed (an amount of data that can be processed per unit time), a time delay of data processing, and an amount of data that can be processed, etc.

The terminal may determine whether the capability information satisfies the preset requirement of the data to be processed according to the received capability information. For example, if the capability information is speed, the preset requirement may be a preset speed required to process the data to be processed, and whether the capability information satisfies the preset requirement may be specifically determined, by the terminal, by determining whether the speed of data processing is greater than the preset speed. For example, if the capability information is a time delay, the preset requirement may be a preset time delay allowed for processing the data to be processed, and whether the capability information satisfies the preset requirement may be specifically determined, by the terminal, by determining whether the time delay of data processing is less than the preset time delay. For example, if the capability information is a data amount, the preset requirement may be a preset data amount. The preset data amount may be set as needed, or may be related to the amount of the data to be processed. For example, preset data amount may be positively related to the amount of the data to be processed. Whether the capability information satisfies the preset requirement may be specifically determined, by the terminal, by determining whether the amount of data that the network-side device can process is greater than the preset data amount.

It is to be noted that, the preset requirement may be fixed or changeable.

For example, the preset requirement is a preset speed. The preset speed may be fixed. In the step S2, the terminal can always determine whether the data processing speed of the network-side device is greater than the preset speed.

For example, the preset requirement is a preset data amount, the preset data amount may be changeable. Specifically, the preset data amounts of different data to be processed may be different. For example, the preset data amount may be equal to the data amount of the data to be processed. Then, in step S2, the terminal can first determine the data amount of the data to be processed, and then the data amount of the data to be processed is used as the preset data amount and is compared with an amount of data that can be processed by the network-side device, to determine whether the amount of data that can be processed by the network-side device is greater than the preset data amount.

With the embodiments of the present disclosure, on the one hand, the terminal can send the data to be processed to the network-side device for processing, so as to reduce the load of a processor in the terminal, in addition, the processing capability of the network-side device is generally stronger than that of the terminal, which is conducive to improving the speed of processing the data to be processed, reducing the time delay of processing the data to be processed, and making full use of the performance of the network-side device; on the other hand, the network-side device sends the capability information to the terminal, so that the terminal can accurately confirm whether sending the data to be processed to the network-side device for processing can satisfy the preset requirement of the data to be processed, and the data to be processed is sent to the network-side device for processing when the preset requirement is satisfied, it is beneficial to ensure that sending the data to be processed to the network-side device for processing can meet the requirement of a user of the terminal.

In some examples, the capability information is included in a broadcast signaling, or in a unicast signaling.

In an embodiment, the network-side device may broadcast the capability information through the broadcast signaling, and then a terminal that listens to the broadcast signaling can learn the capability information of the network-side device. The network-side device may also pointedly send the capability information to a certain terminal or several terminals through a unicast signaling, then only the terminal that receives the unicast signaling can learn the capability information of the network-side device.

Figure 2:
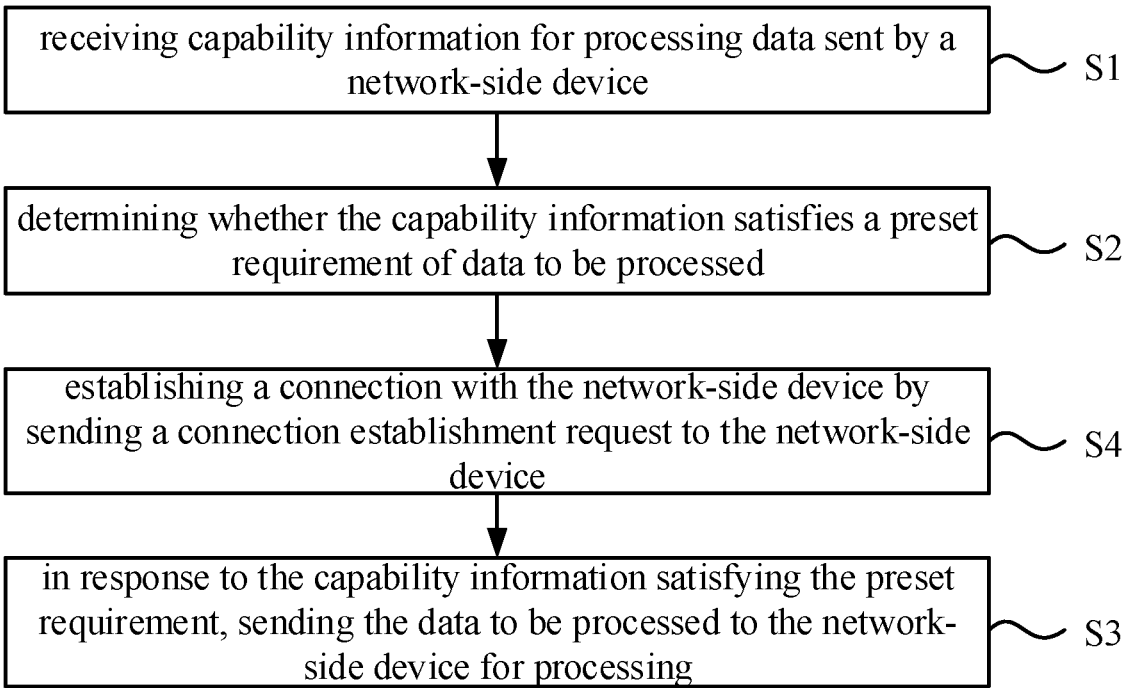
FIG. 2 is a flow chart of a method for data processing according to another embodiment of the present disclosure.

FIG. 2 is a flow chart of a method for data processing according to another embodiment of the present disclosure. As illustrated in FIG. 2, the capability information is included in the broadcast signaling, before the data to be processed is sent to the network-side device, the method further includes the following.

In step S4, a connection with the network-side device is established by sending a connection establishment request to the network-side device.

In an embodiment, in a case that the capability information is included in the broadcast signaling, the terminal may listen to the broadcast signaling before establishing the connection with the network-side device. However, in order to send the data to be processed to the network-side device, the terminal may establish a connection with the network-side device first.

Therefore, the connection establishment request can be sent to the network-side device to establish the connection with the network-side device. For example, an RRC (radio resource control) connection may be established. Then, the terminal can send the data to be processed to the network-side device through the established connection.

When the capability information is included in the unicast signaling, the terminal receives the unicast signaling of the network-side device through the connection with the network-side device. Therefore, when the terminal is able to receive the unicast signaling, the connection with the network-side device has been established. Thus, the data to be processed can be directly sent to the network-side device through the connection.

FIG. 3 is a flow chart of a method for data processing according to yet another embodiment of the present disclosure. As illustrated in FIG. 3, before the data to be processed is sent to the network-side device, the method further includes the following.

In step S5, a request for processing the data to be processed is sent to the network-side device.

When permission information fed back for the request from the network-side device is received, the data to be processed is sent to the network-side device.

In an embodiment, in some cases, although the capability information for processing data of the network-side device can meet the preset requirement, the network-side device may not allow the terminal to send the data to be processed to the network-side device. For example, due to receiving the data to be processed sent from the terminal for several times in a short period of time, the network-side device blacklists the terminal, and the network-side device may not process the data from the terminal for a period of time. If the terminal directly sends the data to be processed to the network-side device, the network-side device may not process the data to be processed. As a result, the resources occupied by the terminal sending the data to be processed are wasted.

In an embodiment, the terminal may first send the request for processing the data to be processed to the network-side device. After the network-side device receives the request to process the data to be processed, if the terminal is allowed to send the data to be processed to the network-side device, the permission information may be fed back to the terminal in response to the request. The terminal sends the data to be processed to the network-side device under the condition of receiving the permission information. Accordingly, it is beneficial to ensure that the network-side device can process the data to be processed as long as the terminal sends the data to be processed to the network-side device, ensuring that the operation of the terminal sending the data to be processed to the network-side device is effective, and avoiding waste of resources.

In some examples, the capability information includes at one of:

speed, time delay, and data amount.

In an embodiment, for example, the capability information is the speed, the preset requirement may be a preset speed, and whether the capability information satisfies the preset requirement may be specifically determined, by the terminal, by determining whether the speed of data processing is greater than the preset speed.

In an embodiment, for example, the capability information is the time delay, the preset requirement may be a preset time delay, and whether the capability information satisfies the preset requirement may be specifically determined, by the terminal, by determining whether the time delay of data processing is less than the preset time delay.

In an embodiment, for example, the capability information is the data amount (referring to the amount of data that the network-side device can process), the preset requirement may be a preset data amount, and whether the capability information satisfies the preset requirement may be specifically determined, by the terminal, by determining whether the amount of data that the network-side device can process is greater than the preset data amount.

The capability information may include at least one of the three items: speed, delay, and data amount. When one item is included, it is determined whether the capability information of this item of meets the preset requirement. When two or more items are included, then it is determined whether each item of the capability information meets the preset requirement.

FIG. 4 is a flow chart of a method for data processing according to yet another embodiment of the present disclosure. As illustrated in FIG. 4, the method further includes the following.

In step S6, data obtained after the network-side device processes the data to be processed is received.

In an embodiment, the network-side device may process the data to be processed, and sends the processed data back to the terminal, and the terminal may receive the processed data.

Figure 5:
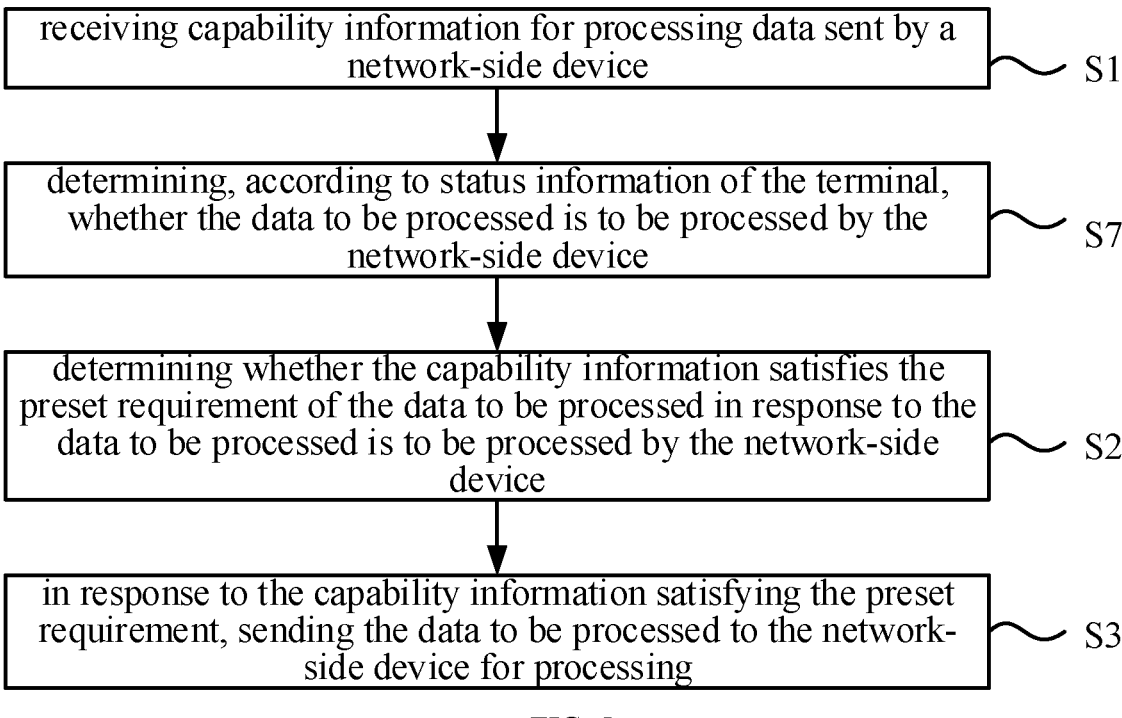
FIG. 5 is a flow chart of a method for data processing according to yet another embodiment of the present disclosure.

FIG. 5 is a flow chart of a method for data processing according to yet another embodiment of the present disclosure. As illustrated in FIG. 5, before it is determined whether the capability information satisfies the preset requirement of the data to be processed, the method further includes the following.

In step S7, it is determined, according to status information of the terminal, whether the data to be processed is to be processed by the network-side device.

When it is determined that the data to be processed is to be processed by the network-side device, the step in S2 is performed, i.e., it is determined whether the capability information satisfies the preset requirement of the data to be processed.

In an embodiment, before it is determined whether the capability information satisfies the preset requirement of the data to be processed, the terminal may obtain the status information of the terminal. In some examples, the status information includes at least one of: power level and load of a processor. Then, it is determined, according to the status information of the terminal, whether the data to be processed is to be processed by the network-side device.

For example, in a case that the status information is the power level, the terminal can determine whether the power level is lower than a preset power level. When the power level is lower than the preset power level, the power of the terminal may be quickly exhausted if the data to be processed is still processed by the terminal. Therefore, in this case, it may be determined that the data to be processed may be processed by the network-side device, so that the data to be processed is sent to the network-side device, which is beneficial to ensure that the terminal can last a long time based on the remaining power.

For example, in a case that the status information is the load of the processor, the terminal can determine whether the load of the processor is higher than a preset load. When the load of the processor is higher than the preset load, the terminal may be slow to process the data to be processed and difficult to process other content if the data to be processed is still processed by the terminal. Therefore, in this case, it may be determined that the data to be processed may be processed by the network-side device, so that the data to be processed is sent to the network-side device, which is beneficial to ensure that the processor of the terminal can process other content efficiently, and the data to be processed may be efficiently processed by the network-side device.

Figure 6:
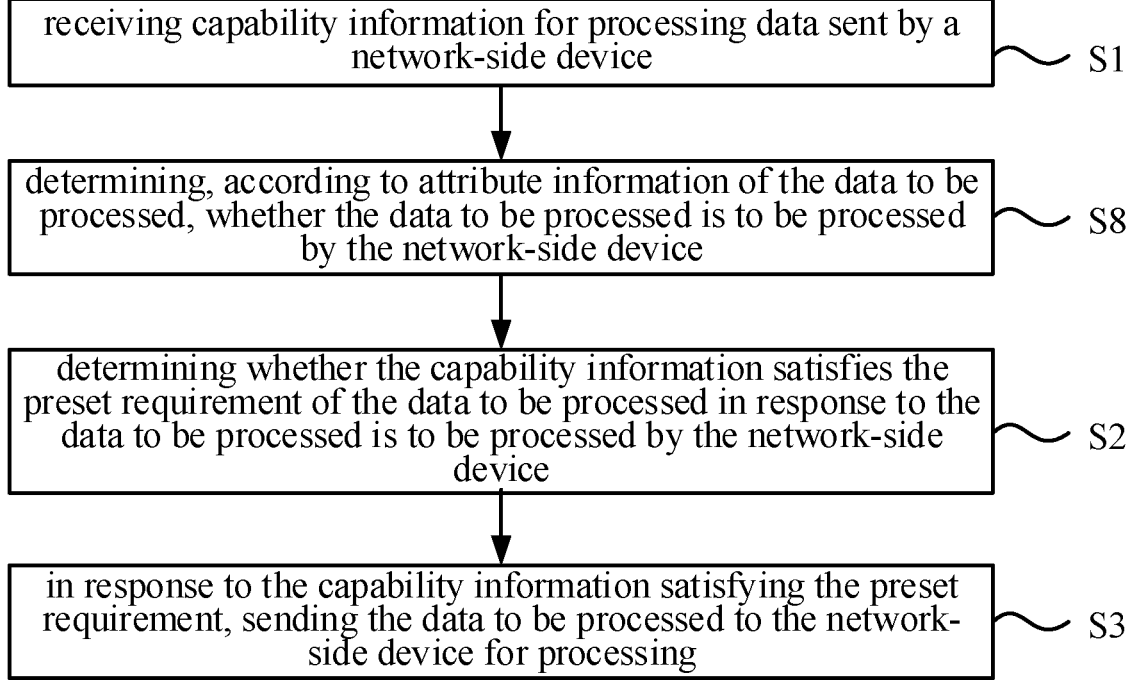
FIG. 6 is a flow chart of a method for data processing according to yet another embodiment of the present disclosure.

FIG. 6 is a flow chart of a method for data processing according to yet another embodiment of the present disclosure. As illustrated in FIG. 6, before it is determined whether the capability information satisfies the preset requirement of the data to be processed, the method further includes the following.

In step S8, it is determined, according to attribute information of the data to be processed, whether the data to be processed is to be processed by the network-side device.

When it is determined that the data to be processed is to be processed by the network-side device, the step in S2 is performed, i.e., it is determined whether the capability information satisfies the preset requirement of the data to be processed.

In an embodiment, before it is determined whether the capability information satisfies the preset requirement of the data to be processed, the terminal may obtain the attribute information of the data to be processed. In some examples, the attribute information includes at least one of: data amount and data type. Then, it is determined, according to the attribute information of the data to be processed, whether the data to be processed is to be processed by the network-side device.

For example, in a case that the attribute information is the data amount, the terminal can determine whether the data amount is greater than a preset data amount. When the data amount is lower than the preset data amount (which be the same as or different from the preset data amount in the embodiment shown in FIG. 1), if the data to be processed is still processed by the terminal, processing a large amount of data will cause excessive delay because that the processing capability of the terminal is generally lower than that of the network-side device.

Therefore, in this case, it can be determined that the data to be processed is to be processed by the network-side device, so that the data to be processed is sent to the network-side device to ensure that processing the data to be processed may be completed in a relatively short period of time, reducing the time delay of processing the data to be processed, which is beneficial to ensure the user experience.

For example, in a case that the attribute information is the data type, the terminal can determine whether the data type is a preset type. The preset type may be set as needed. For example, the preset type is processing with a machine learning model. Since the machine learning model may be obtained by using a large amount of data as a training sample and performing machine learning, and in some cases, the model may be continuously updated based on a large amount of data, the amount of data to be processed may be large, and the processing process is complicated. If the data to be processed is still processed by the terminal, the speed of the terminal for processing the data to be processed may be slow.

Therefore, in this case, it can be determined that the data to be processed is to be processed by the network-side device, so that the data to be processed is sent to the network-side device. Due to the strong processing capability of the network-side device, it is convenient to perform machine learning by using a large amount of data as a sample to obtain a machine learning model. Therefore, it is beneficial to ensure that processing the data to be processed may be completed in a relatively short period of time, reducing the time delay of processing the data to be processed, which is beneficial to ensure the user experience.

Figure 7:
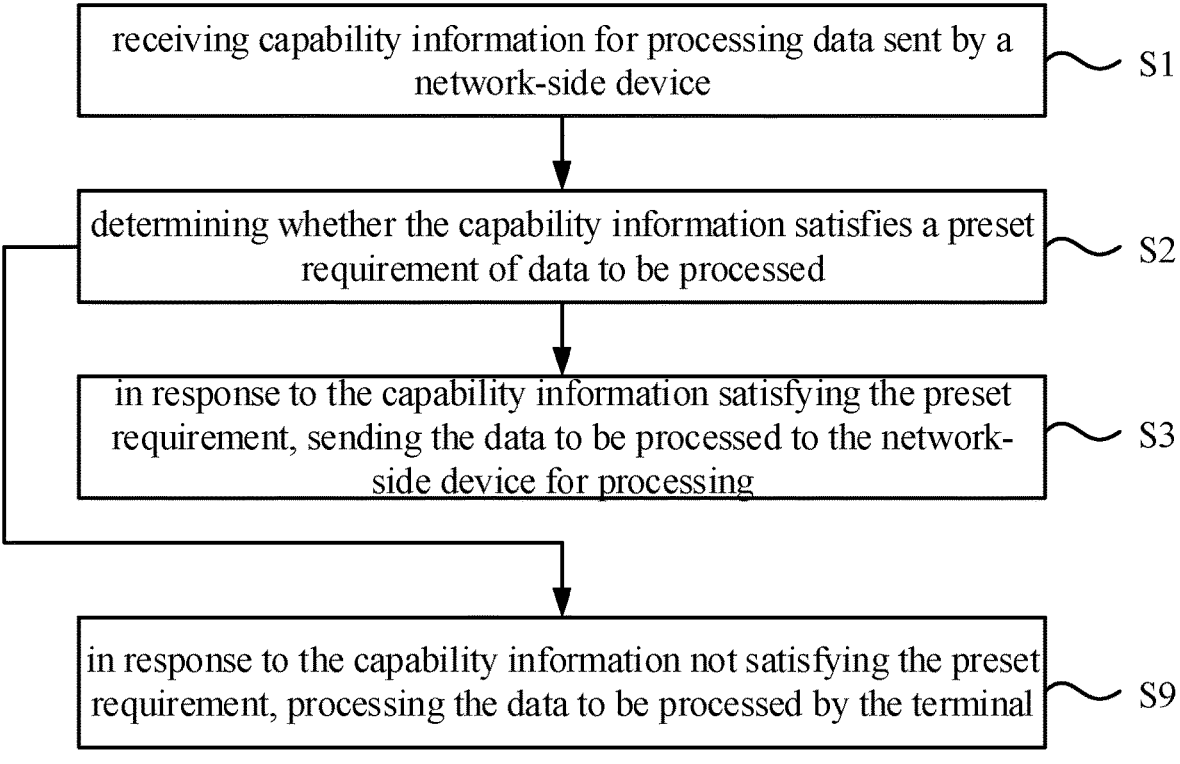
FIG. 7 is a flow chart of a method for data processing according to yet another embodiment of the present disclosure.

FIG. 7 is a flow chart of a method for data processing according to yet another embodiment of the present disclosure. As illustrated in FIG. 7, the method further includes the following.

In step S9, in response to the capability information not satisfying the preset requirement, the terminal processes the data to be processed.

In an embodiment, in some cases, the capability information of the network-side device to process data does not satisfy the preset requirement, then the terminal can process the data to be processed by itself, so as to ensure that processing of the data to be processed can be completed in a relatively short period of time, reducing the time delay of processing the data to be processed, so as to ensure the user experience.

It is to be noted that, the embodiments shown in FIG. 5 and FIG. 6 may be combined with the embodiment shown in FIG. 7. For example, in a case that it is determined, according to the attribute information of the data to be processed, that the data to be processed is to be processed by the network-side device, or a case that it is determined, according to the status information of the terminal, that the data to be processed is to be processed by the network-side device, but the capability information of the network-side device to process the data does not satisfy the preset requirement, the terminal may estimate a first time delay of processing the data to be processed by the terminal itself, and a second time delay of sending the data to be processed to the network-side device for processing (the second time delay may include a time delay of sending the data to be processed to the network-side device by the terminal, a time delay of processing the data to be processed by the network-side device, and a time delay of sending the processed data to the terminal by the network-side device). And then the first time delay and the second time delay are compared. If the first time delay is greater than the second time delay, the data to be processed may be sent to the network-side device for processing. If the first time delay is less than or equal to the second time delay, the terminal can process the data to be processed by itself.

Figure 8:
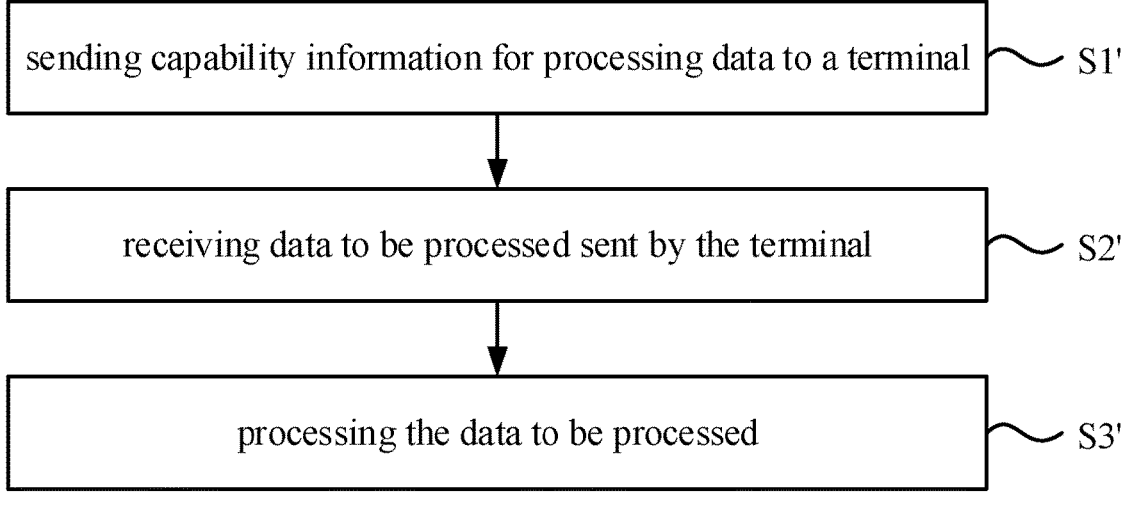
FIG. 8 is a flow chart of a method for data processing according to an embodiment of the present disclosure.

FIG. 8 is a flow chart of a method for data processing according to an embodiment of the present disclosure. The method for data processing illustrated in this embodiment may be suited for a network-side device. The network-side device includes, but is not limited to, a base station, a core network, and a multi-access edge computing server. The network-side device can communicate with a terminal. The terminal includes, but is not limited to, an electronic device such as a mobile phone, a tablet computer, and a wearable device. For example, the network-side device may communicate with the terminal based on 4G LTE, and may also communicate with the terminal based on 5G NR.

The terminal and the network-side device may have AI capabilities. Based on the AI capabilities, the terminal can quickly process information such as images, videos, languages, and texts, so as to quickly respond to the user. Compared with the terminal, the network-side device can process a larger amount of data, and the processing speed can be faster than that of the terminal. For example, the network-side device can use a large amount of data as a sample for machine learning to obtain a machine learning model for processing data.

As illustrated in FIG. 8, the method for data processing may include the following steps.

In step S1', capability information for processing data is sent to a terminal.

In step S2', data to be processed sent by the terminal is received.

In step S3', the data to be processed is processed.

In an embodiment, the network-side device may send the capability information for processing data to the terminal, such as a data processing speed (an amount of data that can be processed per unit time), a time delay of data processing, and an amount of data that can be processed, etc. So that the terminal can determine whether the capability information satisfies a preset requirement of the data to be processed according to the received capability information.

With the embodiments of the present disclosure, on the one hand, the network-side device can processed the data to be processed sent by the terminal, which is beneficial to reduce the load of a processor in the terminal, in addition, the processing capability of the network-side device is generally stronger than that of the terminal, which is conducive to improving the speed of processing the data to be processed; on the other hand, the network-side device sends the capability information to the terminal, so that the terminal can accurately confirm whether sending the data to be processed to the network-side device for processing can satisfy the preset requirement of the data to be processed, and the data to be processed is sent to the network-side device for processing when the preset requirement is satisfied, it is beneficial to ensure that sending the data to be processed to the network-side device for processing can meet the requirement of a user of the terminal.

In some examples, the capability information is included in a broadcast signaling, or in a unicast signaling.

In an embodiment, the network-side device may broadcast the capability information through the broadcast signaling, and then a terminal that listens to the broadcast signaling can learn the capability information of the network-side device. The network-side device may also pointedly send the capability information to a certain terminal or several terminals through a unicast signaling, then only the terminal that receives the unicast signaling can learn the capability information of the network-side device.

Figure 9:
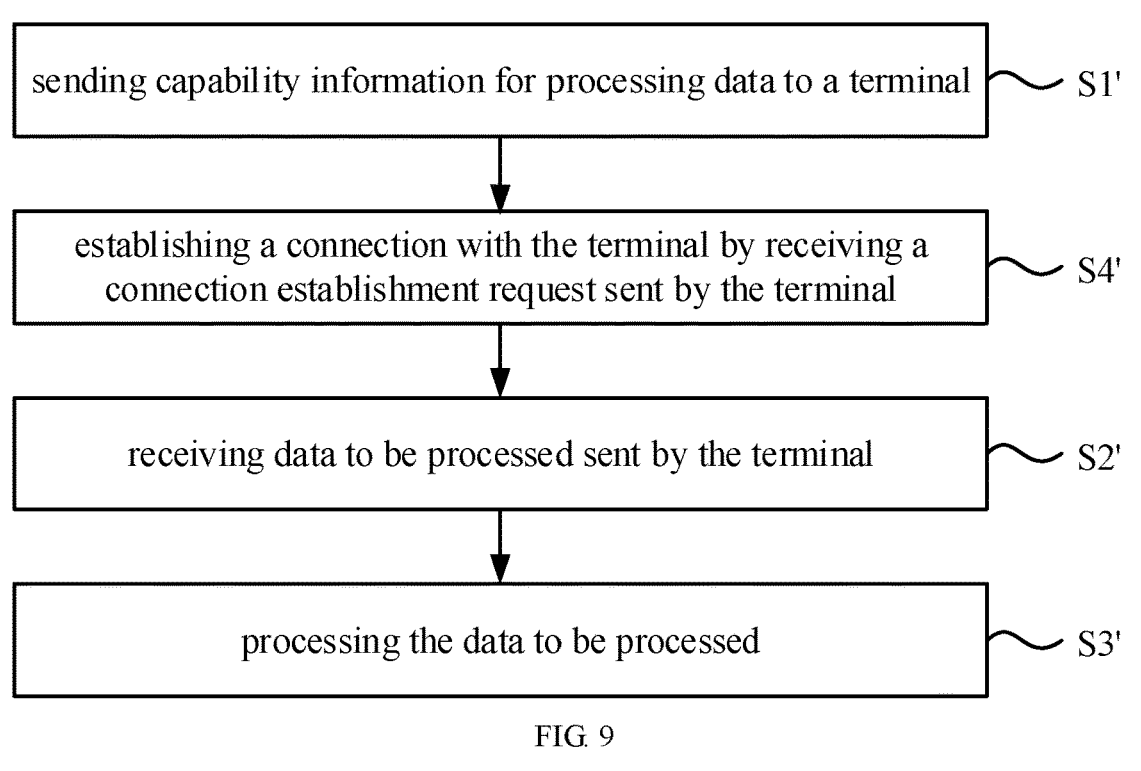
FIG. 9 is a flow chart of a method for data processing according to another embodiment of the present disclosure.

FIG. 9 is a flow chart of a method for data processing according to another embodiment of the present disclosure. As illustrated in FIG. 9, the capability information is included in the broadcast signaling, before the data to be processed sent by the terminal is received, the method further includes the following.

In step S4', a connection with the terminal is established by receiving a connection establishment request sent by the terminal.

In an embodiment, in a case that the capability information is included in the broadcast signaling, the network-side device may broadcast the broadcast signaling before establishing the connection with the terminal. However, in order to receive the data to be processed sent by the terminal, the network-side device may establish a connection with the terminal.

Therefore, the connection establishment request sent by the terminal may be received to establish the connection with the terminal. For example, an RRC connection may be established. Then, the network-side device can receive the data to be processed through the established connection.

When the capability information is included in the unicast signaling, the network-side device sends the unicast signaling to the terminal through the connection with the terminal. Therefore, when the terminal is able to receive the unicast signaling, the connection with the network-side device has been established. Thus, the data to be processed sent by the terminal can be directly received through the connection.

Figure 10:
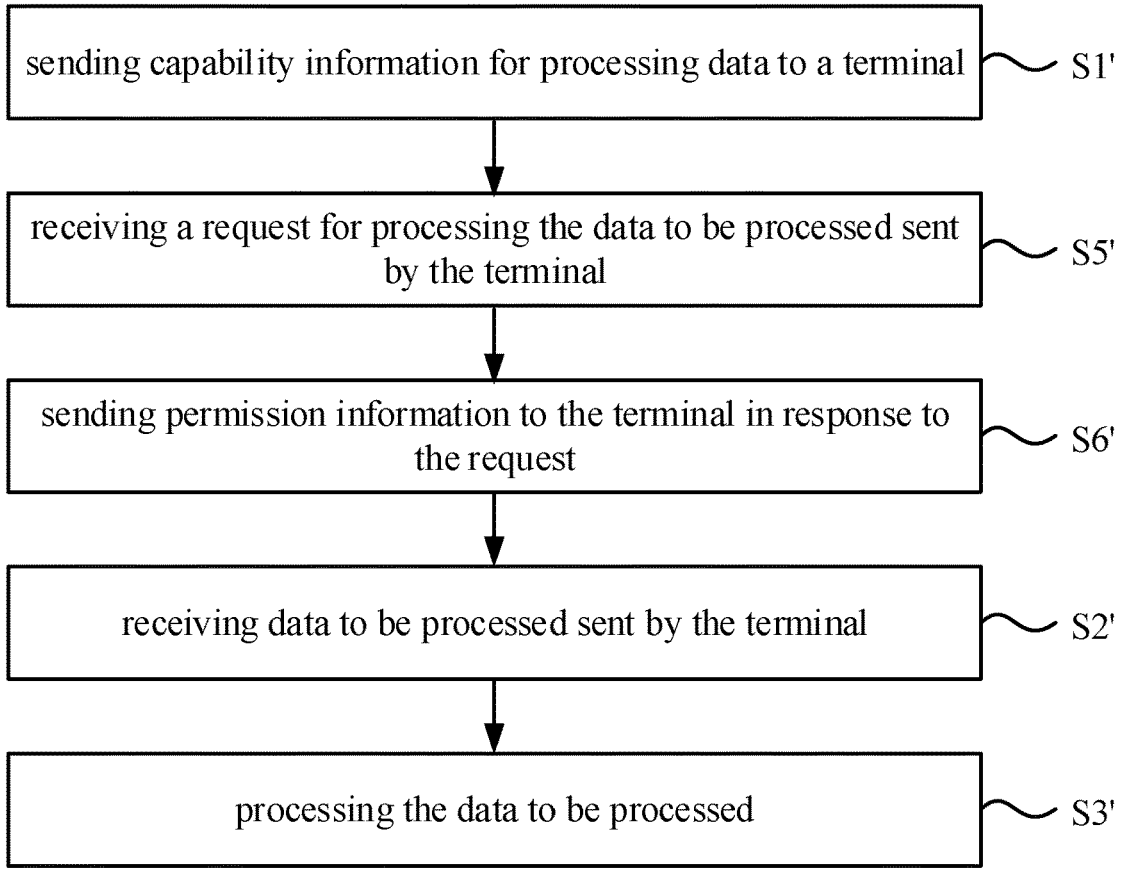
FIG. 10 is a flow chart of a method for data processing according to yet another embodiment of the present disclosure.

FIG. 10 is a flow chart of a method for data processing according to yet another embodiment of the present disclosure. As illustrated in FIG. 10, before the data to be processed sent by the terminal is received, the method further includes the following.

In step S5', a request for processing the data to be processed sent by the terminal is received.

In step S6', permission information is sent to the terminal in response to the request.

In an embodiment, in some cases, although the capability information for processing data of the network-side device can meet the preset requirement, the network-side device may not allow the terminal to send the data to be processed to the network-side device. For example, due to receiving the data to be processed sent from the terminal for several times in a short period of time, the network-side device blacklists the terminal, and the network-side device may not process the data from the terminal for a period of time. If the terminal directly sends the data to be processed to the network-side device, the network-side device may not process the data to be processed. As a result, the resources occupied by the terminal sending the data to be processed are wasted.

In an embodiment, the network-side device may first receive the request for processing the data to be processed sent by the terminal. After the network-side device receives the request to process the data to be processed, if the terminal is allowed to send the data to be processed to the network-side device, the permission information may be fed back to the terminal in response to the request. The terminal sends the data to be processed to the network-side device under the condition of receiving the permission information. Accordingly, it is beneficial to ensure that the network-side device can process the data to be processed as long as the terminal sends the data to be processed to the network-side device, ensuring that the operation of the terminal sending the data to be processed to the network-side device is effective, and avoiding waste of resources.

In some examples, the capability information includes at one of:

speed, time delay, and data amount.

In an embodiment, the network-side device may determine the capability information and/or configuration of network resources according to data processing capability of the network-side device. For example, the capability information is the processing speed, then the network-side device can determine the amount of data that is able to process per unit time as the speed according to the data processing capability of the network-side device. For example, the capability information is the time delay, then the network-side device can determine the time delay according to the configuration (for example, time length from the resource for uploading the data to be processed to the current time configured for the terminal) of the network resources to determine the time delay.

FIG. 11 is a flow chart of a method for data processing according to yet another embodiment of the present disclosure. As illustrated in FIG. 11, the method further includes the following.

In step S7', data obtained after processing the data to be processed is sent to the terminal.

In an embodiment, the network-side device may process the data to be processed, and sends the processed data back to the terminal, and the terminal may receive the processed data. The network-side device can select time domain resources and frequency domain resources as required to send the data to be processed to the terminal.

Corresponding to the foregoing embodiments of the method for data processing, the disclosure also provides embodiments of a data processing apparatus.

FIG. 12 is a block diagram showing a data processing apparatus according to an embodiment of the present disclosure. The data processing apparatus illustrated in this embodiment may be suited for a terminal. The terminal includes, but is not limited to, an electronic device such as a mobile phone, a tablet computer, and a wearable device. The terminal may be used as user equipment to communicate with a network-side device (such as a base station, a core network, and a multi-access edge computing server). For example, the terminal may communicate with the network-side device based on 4G LTE (long term evolution), and may also communicate with the network-side device based on 5G NR (new radio).

The terminal and the network-side device may have AI (artificial intelligence) capabilities. Based on the AI capabilities, the terminal can quickly process information such as images, videos, languages, and texts, so as to quickly respond to the user. Compared with the terminal, the network-side device can process a larger amount of data, and the processing speed can be faster than that of the terminal. For example, the network-side device can use a large amount of data as a sample for machine learning to obtain a machine learning model for processing data.

As illustrated in FIG. 12, the data processing apparatus may include the following.

An information receiving module 1 is configured to receive capability information for processing data sent by a network-side device.

A requirement determining module 2 is configured to determine whether the capability information satisfies a preset requirement of data to be processed.

A data sending module 3 is configured to, in response to the capability information satisfying the preset requirement, send the data to be processed to the network-side device for processing.

In some examples, the capability information is included in a broadcast signaling, or in a unicast signaling.

Figures 13, 14:
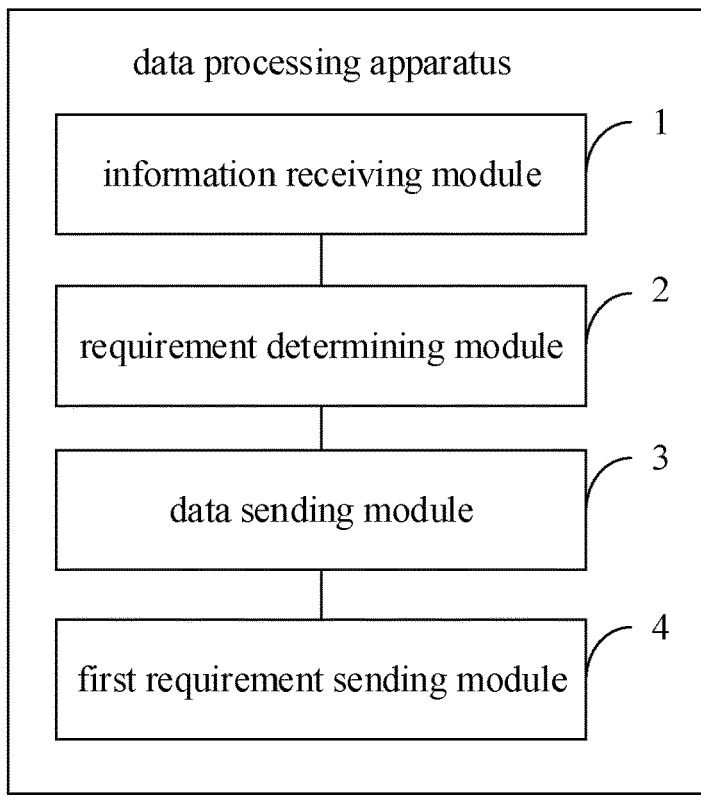
FIG. 13 is a block diagram showing a data processing apparatus according to another embodiment of the present disclosure.
FIG. 14 is a block diagram showing a data processing apparatus according to yet another embodiment of the present disclosure.

FIG. 13 is a block diagram showing a data processing apparatus according to another embodiment of the present disclosure. As illustrated in FIG. 13, the capability information is included in the broadcast signaling, the apparatus further includes:

A first request sending module 4 is configured to establish a connection with the network-side device by sending a connection establishment request to the network-side device.

FIG. 14 is a block diagram showing a data processing apparatus according to yet another embodiment of the present disclosure. As illustrated in FIG. 14, the apparatus includes:

A second request sending module 5 is configured to send a request for processing the data to be processed to the network-side device.

The data sending module 3 is configured to send the data to be processed to the network-side device when permission information fed back for the request from the network-side device is received.

In some examples, the capability information includes at one of:

speed, time delay, and data amount.

Figure 15:
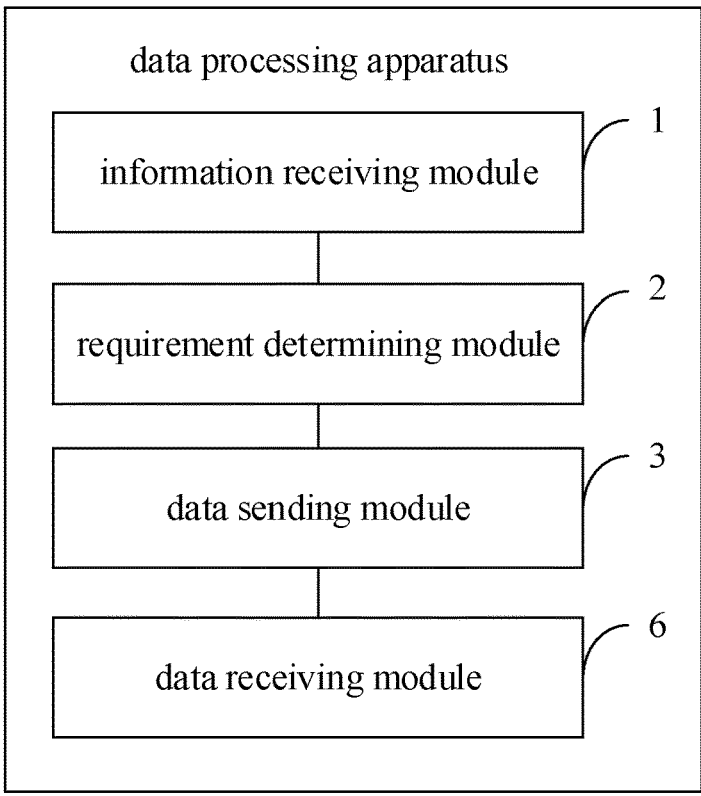
FIG. 15 is a block diagram showing a data processing apparatus according to yet another embodiment of the present disclosure.

FIG. 15 is a block diagram showing a data processing apparatus according to yet another embodiment of the present disclosure. As illustrated in FIG. 15, the apparatus further includes:

A data receiving module 6 is configured to receive data obtained after the network-side device processes the data to be processed.

Figure 16:
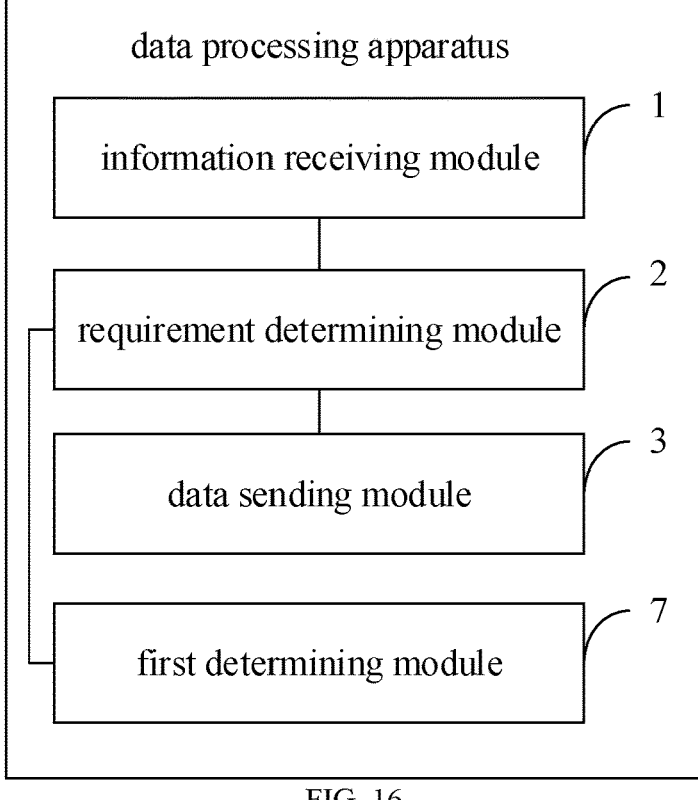
FIG. 16 is a block diagram showing a data processing apparatus according to yet another embodiment of the present disclosure.

FIG. 16 is a block diagram showing a data processing apparatus according to yet another embodiment of the present disclosure. As illustrated in FIG. 16, the apparatus further includes:

A first determining module 7 is configured to determine, according to status information of the terminal, whether the data to be processed is to be processed by the network-side device.

The requirement determining module 2 is configured to determine whether the capability information satisfies the preset requirement of data to be processed in a case that the data to be processed is to be processed by the network-side device.

In some examples, the status information includes at least one of:

power level and load of a processor.

Figures 17, 18:
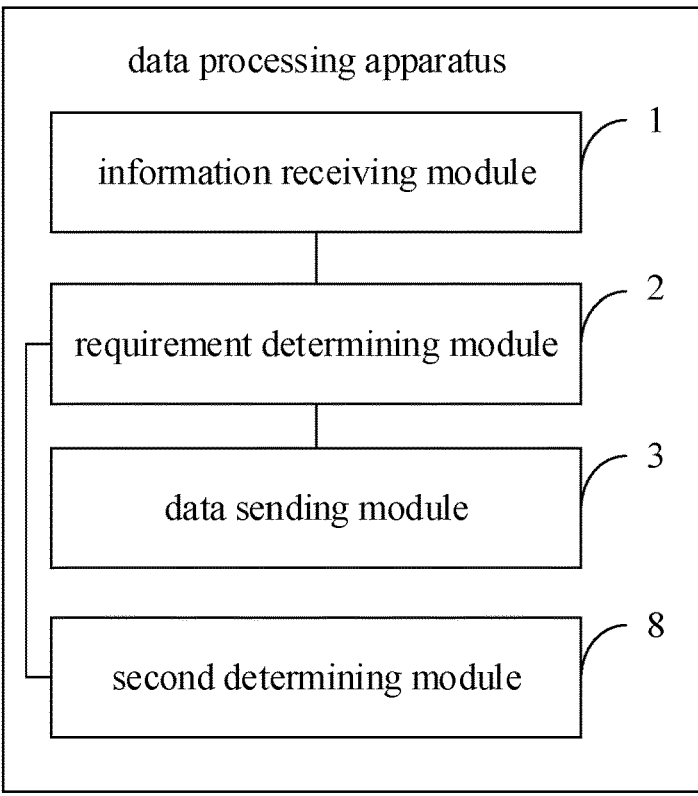
FIG. 17 is a block diagram showing a data processing apparatus according to yet another embodiment of the present disclosure.
FIG. 18 is a block diagram showing a data processing apparatus according to yet another embodiment of the present disclosure.

FIG. 17 is a block diagram showing a data processing apparatus according to yet another embodiment of the present disclosure. As illustrated in FIG. 17, the apparatus further includes:

A second determining module 8 is configured to determine, according to attribute information of the data to be processed, whether the data to be processed is to be processed by the network-side device.

The requirement determining module 2 is configured to determine whether the capability information satisfies the preset requirement of data to be processed in a case that the data to be processed is to be processed by the network-side device.

In some examples, the attribute information includes at least one of:

data amount and data type.

FIG. 18 is a block diagram showing a data processing apparatus according to yet another embodiment of the present disclosure. As illustrated in FIG. 18, the apparatus further includes:

A data processing module 9 is configured to process the data to be processed I a case that the capability information does not satisfy the preset requirement.

Figures 19, 20:
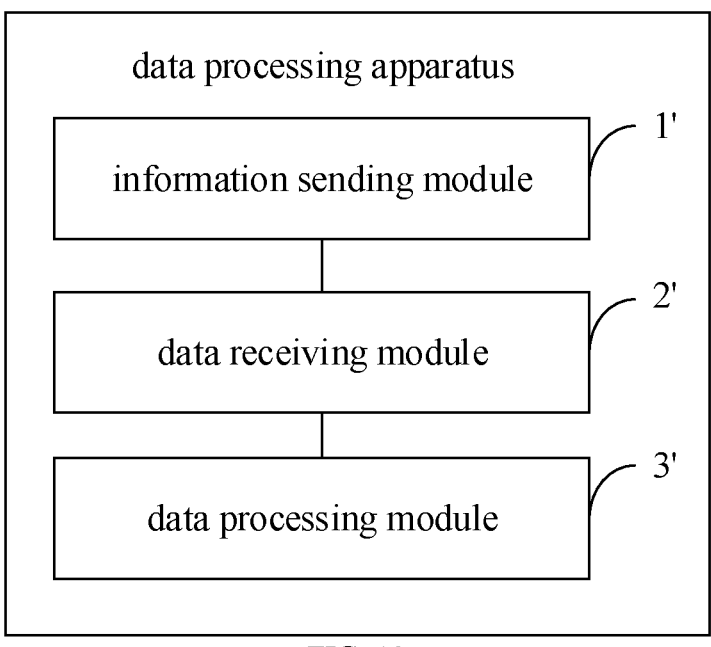
FIG. 19 is a block diagram showing a data processing apparatus according to an embodiment of the present disclosure.
FIG. 20 is a block diagram showing a data processing apparatus according to an embodiment of the present disclosure.

FIG. 19 is a block diagram showing a data processing apparatus according to an embodiment of the present disclosure. The data processing apparatus illustrated in this embodiment may be suited for a network-side device. The network-side device includes, but is not limited to, a base station, a core network, and a multi-access edge computing server. The network-side device can communicate with a terminal. The terminal includes, but is not limited to, an electronic device such as a mobile phone, a tablet computer, and a wearable device. For example, the network-side device may communicate with the terminal based on 4G LTE, and may also communicate with the terminal based on 5G NR.

The terminal and the network-side device may have AI capabilities. Based on the AI capabilities, the terminal can quickly process information such as images, videos, languages, and texts, so as to quickly respond to the user. Compared with the terminal, the network-side device can process a larger amount of data, and the processing speed can be faster than that of the terminal. For example, the network-side device can use a large amount of data as a sample for machine learning to obtain a machine learning model for processing data.

As illustrated in FIG. 19, the data processing apparatus may include the following.

An information sending module 1' is configured to send capability information for processing data to a terminal;

A data receiving module 2' is configured to receive data to be processed sent by the terminal; and A data processing module 3' is configured to process the data to be processed.

In some examples, the capability information is included in a broadcast signaling, or in a unicast signaling.

FIG. 20 is a block diagram showing a data processing apparatus according to an embodiment of the present disclosure. As illustrated in FIG. 20, the capability information is included in the broadcast signaling, the apparatus further includes:

A first request receiving module 4' is configured to establish a connection with the terminal by receiving a connection establishment request sent by the terminal.

Figure 21:
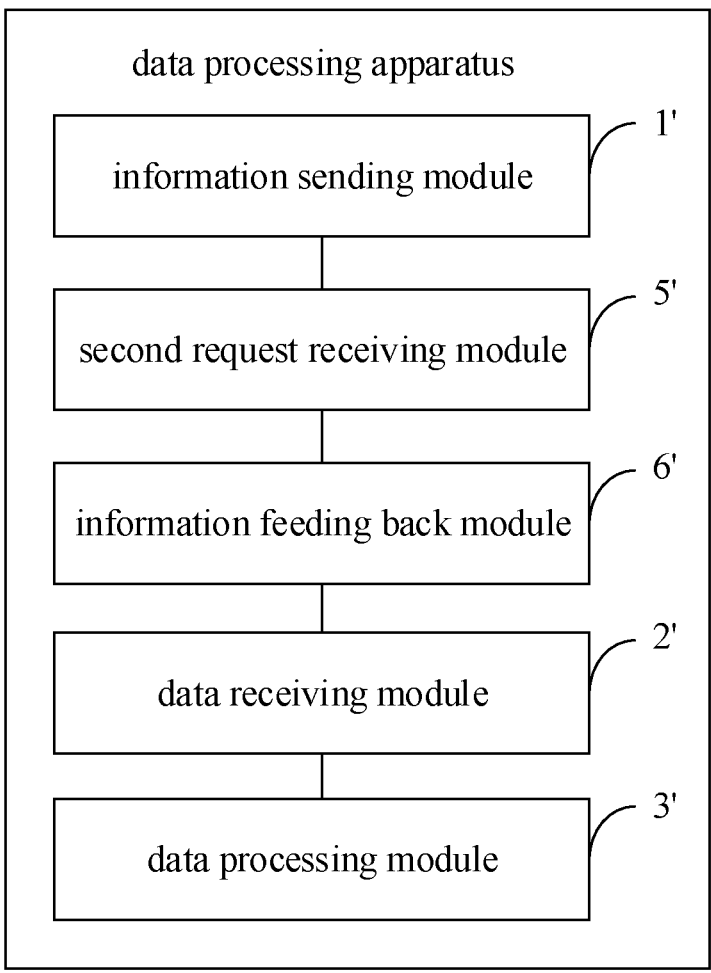
FIG. 21 is a block diagram showing a data processing apparatus according to an embodiment of the present disclosure.

FIG. 21 is a block diagram showing a data processing apparatus according to an embodiment of the present disclosure. As illustrated in FIG. 21, the apparatus includes:

A second request receiving module 5' is configured to receive a request for processing the data to be processed sent by the terminal.

An information fed back module 6' is configured to send permission information to the terminal in response to the request.

In some examples, the capability information includes at one of:

speed, time delay, and data amount.

Figure 22:
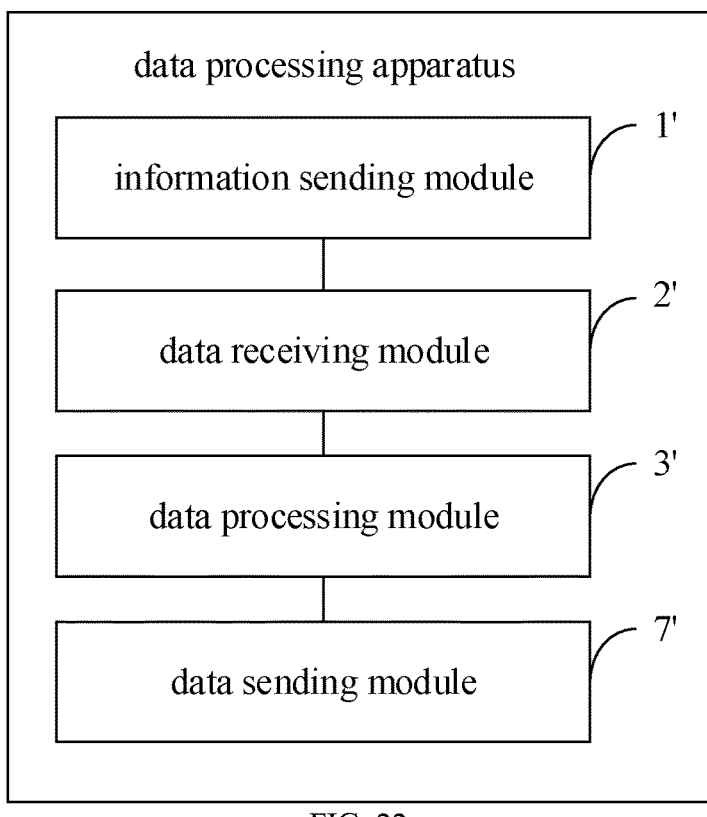
FIG. 22 is a block diagram showing a data processing apparatus according to an embodiment of the present disclosure.

FIG. 22 is a block diagram showing a data processing apparatus according to an embodiment of the present disclosure. As illustrated in FIG. 21, the apparatus further includes:

A data sending module 7' is configured to send data obtained after processing the data to be processed to the terminal.

Regarding the apparatus in the above-mentioned embodiments, the specific manner in which each module performs operations has been described in detail in the embodiments of the related method, and will not be described in detail here.

As for the apparatus embodiments, since they basically correspond to the method embodiments, reference may be made to the partial descriptions of the method embodiments for relevant parts. The apparatus embodiments described above are only illustrative, in which the modules described as separate components may or may not be physically separated, and the components displayed as modules may or may not be physical modules, that is, they may be located in one place, or they may be distributed over multiple network modules. Some or all of the modules may be selected according to actual needs to achieve the purpose of the solution of this embodiment. Those skilled in the art can understand and implement it without creative effort.

Embodiments of the disclosure further provide an electronic device. The electronic device includes:

a processor; and a memory configured to store instruction executable by the processor.

The processor is configured to implement the method for data processing performed by the terminal according to any of the above embodiments.

Embodiments of the disclosure further provide an electronic device. The electronic device includes:

a processor; and a memory configured to store instruction executable by the processor.

The processor is configured to implement the method for data processing performed by the network-side device according to any of the above embodiments.

Embodiments of the disclosure further provide a computer-readable storage medium. A computer program is stored on the computer-readable storage medium. Steps of the method for data processing performed by the terminal according to any of the above embodiments is implemented when the program is executed by a processor.

Embodiments of the disclosure further provide a computer-readable storage medium. A computer program is stored on the computer-readable storage medium. Steps of the method for data processing performed by the network-side device according to any of the above embodiments is implemented when the program is executed by a processor.

Figure 23:
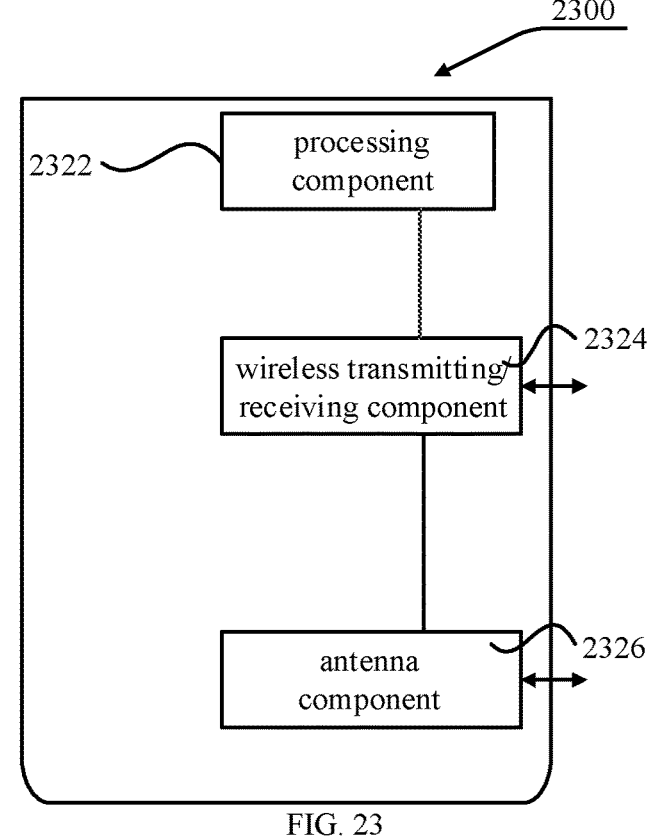
FIG. 23 is a schematic diagram showing an apparatus for data processing according to an embodiment of the present disclosure.

As illustrated in FIG. 23, FIG. 23 is a schematic diagram showing an apparatus 2300 for data processing according to an embodiment of the present disclosure. The apparatus 2300 may be provided as a network-side device. As illustrated in FIG. 23, the apparatus 2300 includes a processing component 2322, a wireless transmitting/receiving component 2324, an antenna component 2326, and a signal processing portion specific to a wireless interface. The processing component 2322 may further include one or more processors. One processor in the processing component 2322 may be configured to implement the method for data processing performed by the network-side device described in any of the above embodiments.

Figure 24:
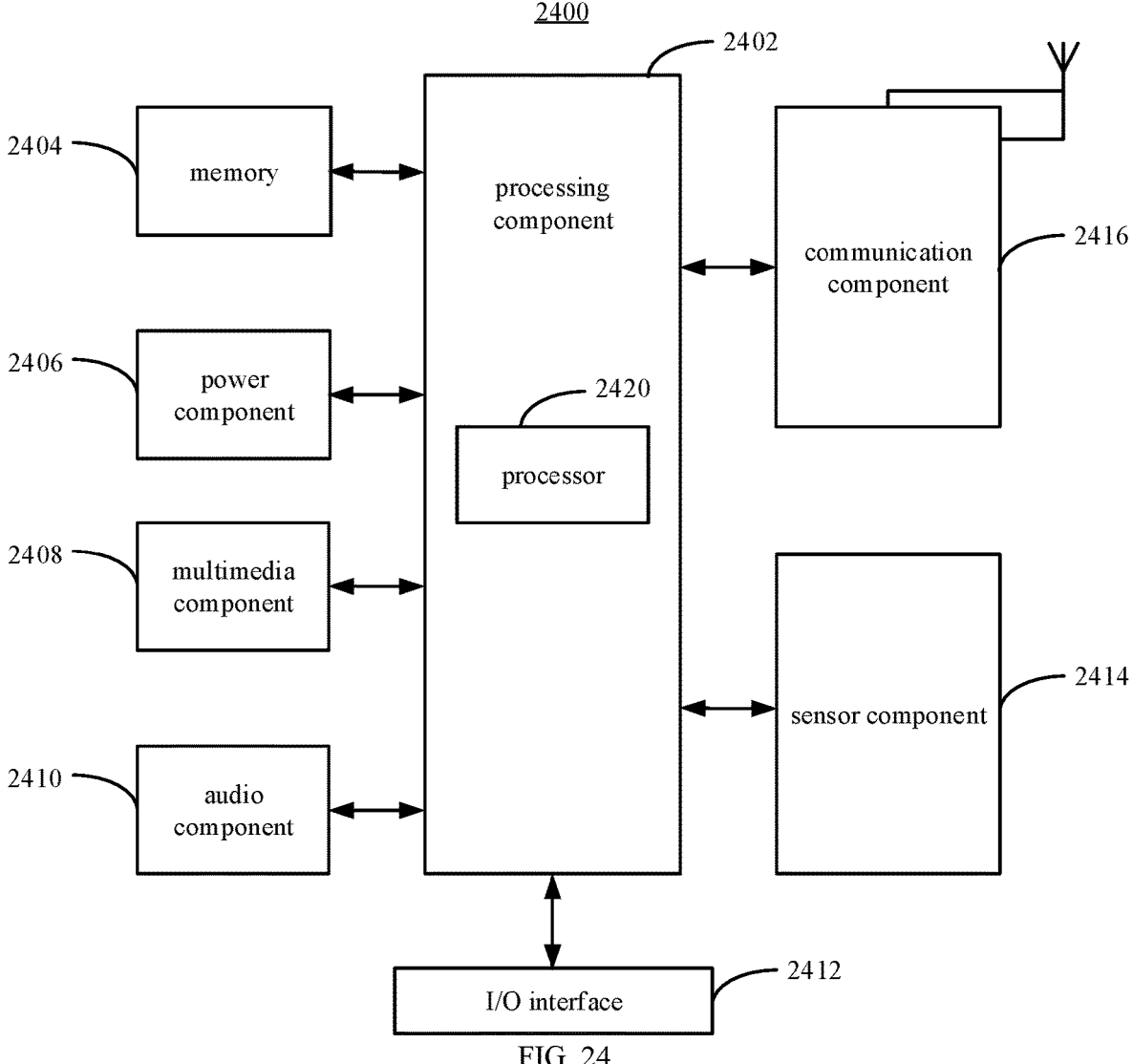
FIG. 24 is a schematic diagram showing an apparatus for data processing according to an embodiment of the present disclosure.

FIG. 24 is a schematic diagram showing an apparatus 2400 for data processing according to an embodiment of the present disclosure. For example, the apparatus 2400 may be a mobile phone, a computer, a digital broadcast terminal, a messaging device, a gaming console, a tablet, a medical device, exercise equipment, a personal digital assistant, and the like.

As illustrated in FIG. 24, the apparatus 2400 may include one or more of the following components: a processing component 2402, a memory 2404, a power component 2406, a multimedia component 2408, an audio component 2410, an input/output (I/O) interface 2412, a sensor component 2414, and a communication component 2416.

The processing component 2402 typically controls overall operations of the apparatus 2400, such as the operations associated with display, telephone calls, data communications, camera operations, and recording operations. The processing component 2402 may include one or more processors 2420 to execute instructions to perform all or part of the steps in the above described methods. Moreover, the processing component 2402 may include one or more modules which facilitate the interaction between the processing component 2402 and other components. For instance, the processing component 2402 may include a multimedia module to facilitate the interaction between the multimedia component 2408 and the processing component 2402.

The memory 2404 is configured to store various types of data to support the operation of the apparatus 2400. Examples of such data include instructions for any applications or methods operated on the apparatus 2400, contact data, phonebook data, messages, pictures, video, etc. The memory 2404 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 2406 provides power to various components of the apparatus 2400. The power component 2406 may include a power management system, one or more power sources, and any other components associated with the generation, management, and distribution of power in the apparatus 2400.

The multimedia component 2408 includes a screen providing an output interface between the apparatus 2400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2408 includes a front camera and/or a rear camera. The front camera and the rear camera may receive an external multimedia datum while the apparatus 2400 is in an operation mode, such as a photographing mode or a video mode. Each of the front camera and the rear camera may be a fixed optical lens system or have focus and optical zoom capability.

The audio component 2410 is configured to output and/or input audio signals. For example, the audio component 2410 includes a microphone (MIC) configured to receive an external audio signal when the apparatus 2400 is in an operation mode, such as a call mode, a recording mode, and a voice recognition mode. The received audio signal may be further stored in the memory 2404 or transmitted via the communication component 2416. In some embodiments, the audio component 2410 further includes a speaker to output audio signals.

The I/O interface 2412 provides an interface between the processing component 2402 and peripheral interface modules, such as a keyboard, a click wheel, buttons, and the like. The buttons may include, but are not limited to, a home button, a volume button, a starting button, and a locking button.

The sensor component 2414 includes one or more sensors to provide status assessments of various aspects of the apparatus 2400. For instance, the sensor component 2414 may detect an open/closed status of the apparatus 2400, relative positioning of components, e.g., the display and the keypad, of the apparatus 2400, a change in position of the apparatus 2400 or a component of the apparatus 2400, a presence or absence of user contact with the apparatus 2400, an orientation or an acceleration/deceleration of the apparatus 2400, and a change in temperature of the apparatus 2400. The sensor component 2414 may include a proximity sensor configured to detect the presence of nearby objects without any physical contact. The sensor component 2414 may also include a light sensor, such as a CMOS or CCD image sensor, for use in imaging applications. In some embodiments, the sensor component 2414 may also include an accelerometer sensor, a gyroscope sensor, a magnetic sensor, a pressure sensor, or a temperature sensor.

The communication component 2416 is configured to facilitate communication, wired or wirelessly, between the apparatus 2400 and other devices. The apparatus 2400 can access a wireless network based on a communication standard, such as Wi-Fi, 2G, or 3G, 4G LET, 5G NR or a combination thereof. In an illustrative embodiment, the communication component 2416 receives a broadcast signal or broadcast associated information from an external broadcast management system via a broadcast channel. In an illustrative embodiment, the communication component 2416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the apparatus 2400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In illustrative embodiments, there is also provided a non-transitory computer-readable storage medium including instructions, such as included in the memory 2404, executable by the processor 2420 in the apparatus 2400, for performing the above-described methods. For example, the non-transitory computer-readable storage medium may be a ROM, a random access memory (SAM), a CD-ROM, a magnetic tape, a floppy disc, an optical data storage device, and the like.

Other implementations of the disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or conventional technical means in the technical field not disclosed by this disclosure. The specification and embodiments are to be regarded as illustrative only, with the true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the present disclosure is limited only by the appended claims.

It is to be noted that, in this description, relational terms such as first and second, etc. are only used to distinguish one entity or operation from another entity or operation, and do not necessarily require or imply any such actual relationship or sequence between these entities or operations. The terms "comprising", "containing" or any other variation thereof are intended to encompass non-exclusive inclusion such that a process, method, article or apparatus comprising a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

The methods and apparatus provided by the embodiments of the disclosure are described in detail above, and specific examples are used herein to illustrate the principles and implementations of the disclosure. The descriptions of the above embodiments are only used to help understand the method of the disclosure and its core idea; at the same time, for those skilled in the art, according to the idea of the disclosure, there will be changes in the specific implementation and application scope. In summary, the content of this specification should not be construed as a limitation of the present disclosure.

What is claimed is:

1. A method for data processing, performed by a terminal which has artificial intelligence capabilities, the method comprising:

sending a connection establishment request to a network-side device;

establishing a radio resource control (RRC) connection with the network device;

listening a broadcast signaling broadcast by the network-side device;

receiving capability information for processing data via a broadcast signaling sent by a network-side device, the network-side device having larger processing capability than the terminal device, wherein the capability information indicates a data processing capability of the network-side device, and the capability information comprises at one of: data processing speed; time delay of data processing; and an amount of data that the network-side device is able to process;

determining whether the capability information satisfies a preset requirement of data to be processed;

in response to the capability information satisfying the preset requirement, sending the data to be processed to the network-side device for processing via RRC connection; and determining, according to status information of the terminal or attribute information of the data to be processed, whether the data to be processed is to be processed by the network-side device;

wherein, determining whether the capability information satisfies the preset requirement of the data to be processed in response to the data to be processed is to be processed by the network-side device;

sending a request for processing the data to be processed to the network-side device via RRC connection;

wherein the data to be processed is sent to the network-side device in response to permission information fed back for the request being received from the network-side device via RRC connection;

in response to determining the data to be processed is to be processed by the network-side device and the capability information of the network-side device to process the data not satisfying the preset requirement, estimating a first time delay of processing the data to be processed by the terminal, and a second time delay of sending the data to be processed to the network-side device for processing, in response to the first time delay being greater than the second time delay, sending the data to be processed to the network-side device for processing, in response to the first time delay being less than or equal to the second time delay, processing the data to be processed by the terminal, wherein the data to be processed by the terminal is at least one of images, videos, languages, or texts;

wherein, the time delay of data processing is determined by the network-side device according to time length from resource for uploading the data to be processed to current time configured for the terminal;

wherein, the status information comprises load of a processor and the attribute information comprises at least one of: data amount; and data type.

2. The method as claimed in claim 1, wherein the capability information is included in a broadcast signaling, or in a unicast signaling.

3. The method as claimed in claim 1, further comprising:

in response to the capability information not satisfying the preset requirement, processing the data to be processed by the terminal.

4. A method for data processing, performed by a network-side device which has artificial intelligence capabilities, the method comprising:

receiving a connection establishment request from a terminal;

establishing a radio resource control (RRC) connection with the terminal;

broadcast a broadcast signaling which contains capability information for processing data to a terminal, the network-side device having larger processing capability than the terminal device, wherein the capability information indicates a data processing capability of the network-side device, and the capability information comprises at one of: data processing speed; time delay of data processing; and an amount of data that the network-side device is able to process;

receiving data to be processed sent by the terminal via RRC connection when the terminal determines that the capability information satisfies a preset requirement of the data to be processed, wherein whether the data to be processed is to be processed by the network-side device is determined according to status information of the terminal or attribute information of the data to be processed;

processing the data to be processed;

receiving a request for processing the data to be processed sent by the terminal via RRC connection;

sending permission information for the request to the terminal via RRC connection;

in response to determining the data to be processed is to be processed by the network-side device and the capability information of the network-side device to process the data not satisfying the preset requirement, in response to a first time delay being greater than a second time delay, receiving the data to be processed from the terminal, wherein the first time delay is a time delay of processing the data to be processed by the terminal, and the second time delay is a time delay of sending the data to be processed to the network-side device for processing;

wherein the time delay in the capability information is determined by the network-side device according to time length from resource for uploading the data to be processed to current time configured for the terminal;

wherein the status information comprises load of a processor and the attribute information comprises at least one of: data amount; and data type;

in response to the data type being processing with a machine learning model, receiving the data to be processed from the terminal and processing the data to be processed.

5. The method as claimed in claim 4, wherein the capability information is included in a broadcast signaling, or in a unicast signaling.

6. The method as claimed in claim 4, further comprising: sending data obtained by processing the data to be processed to the terminal.

7. An electronic device, the electronic device has artificial intelligence capabilities, the electronic device comprises:

a processor; and a memory for storing instructions executable by the processor;

wherein the processor is configured to implement a method for data processing, the method comprising:

sending a connection establishment request to a network-side device;

establishing a radio resource control (RRC) connection with the network device;

listening a broadcast signaling broadcast by the network-side device;

receiving capability information for processing data via a broadcast signaling sent by a network-side device, the network-side device having larger processing capability than the electronic device wherein the capability information indicates a data processing capability of the network-side device, and the capability information comprises at one of: data processing speed;

time delay of data processing; and an amount of data that the network-side device is able to process;

determining whether the capability information satisfies a preset requirement of data to be processed;

in response to the capability information satisfying the preset requirement, sending the data to be processed to the network-side device for processing; and determining, according to status information of the electronic device or attribute information of the data to be processed, whether the data to be processed is to be processed by the network-side device;

wherein, determining whether the capability information satisfies the preset requirement of the data to be processed in response to the data to be processed is to be processed by the network-side device;

sending a request for processing the data to be processed to the network-side device via RRC connection;

wherein the data to be processed is sent to the network-side device in response to permission information fed back for the request being received from the network-side device via RRC connection;

in response to determining the data to be processed is to be processed by the network-side device and the capability information of the network-side device to process the data not satisfying the preset requirement, estimating a first time delay of processing the data to be processed by the electronic device, and a second time delay of sending the data to be processed to the network-side device for processing, in response to the first time delay being greater than the second time delay, sending the data to be processed to the network-side device for processing via RRC connection, in response to the first time delay being less than or equal to the second time delay, processing the data to be processed by the electronic device, wherein the data to be processed by the terminal is at least one of images, videos, languages, or texts;

wherein, the time delay of data processing is determined by the network-side device according to time length from resource for uploading the data to be processed to current time configured for the electronic device;

wherein the status information comprises load of a processor and the attribute information comprises at least one of: data amount; and data type.

8. An electronic device, comprising:

a processor; and a memory for storing instructions executable by the processor;

wherein the processor is configured to implement the method for data processing as claimed in claim 4.

9. A non-transitory computer-readable storage medium having stored therein a computer program that, when executed by a processor, the method for data processing as claimed in claim 1 is implemented.

10. A non-transitory computer-readable storage medium having stored therein a computer program that, when executed by a processor, the method for data processing as claimed in claim 4 is implemented.

* * * * *